United States Patent [19]

Mori et al.

[11] Patent Number: 4,775,493

[45] Date of Patent: Oct. 4, 1988

[54] FLAME-RETARDANT SILICONE FLUID COMPOSITION

[75] Inventors: Shigeru Mori; Motohiko Hirai, both of Annaka, Japan

[73] Assignee: Shin-Etsu Chemical Co., Ltd., Tokyo, Japan

[21] Appl. No.: 132,931

[22] Filed: Dec. 15, 1987

[30] Foreign Application Priority Data

Dec. 16, 1986 [JP]  Japan .................................. 61-299398

[51] Int. Cl.$^4$ .............................................. H01B 3/46
[52] U.S. Cl. .................................... 252/572; 252/573; 252/601
[58] Field of Search ................. 252/572, 573, 601, 602

[56] References Cited

FOREIGN PATENT DOCUMENTS 127903 12/1984 European Pat. Off. ............ 252/573

*Primary Examiner*—Robert Wax
*Attorney, Agent, or Firm*—Wyatt, Gerber, Burke and Badie

[57] ABSTRACT

Silicone fluid-based electric insulation oils can be imparted with greatly enhanced flame retardancy when the base organopolysiloxane contains 0.1 to 30% by moles of vinyl groups relative to the monovalent hydrocarbon groups bonded to the silicone atoms and is admixed with a platinum compound soluble therein, such as chloroplatinic acid, dissolved thereiin in a specified amount. The flame retardancy of the organopolysiloxane/platinum compound composition can be further improved by the addition of a low-viscosity fluorinated hydrocarbon oil such as an oligomeric polymer of chlorotrifluoroethylene.

7 Claims, No Drawings

FLAME-RETARDANT SILICONE FLUID COMPOSITION

BACKGROUND OF THE INVENTION

The present invention relates to a flame retardant silicone fluid composition or, more particularly, to a flame retardant silicone fluid composition which can be used as an insulation oil in electric equipment with high safety by virtue of the excellent flame retardancy and self-extinguishability imparted thereto without affecting the electric properties and heat resistance.

Various kinds of oily materials are known and used as an insulation oil in electric equipments such as electric power cables, capacitors, transformers and the like including mineral oils, phosphate ester oils, aromatic hydrocarbon oils, chlorinated synthetic oils, silicone fluids, fluorocarbon oils and the like. These conventional insulation oils have their respective problems and disadvantages from the standpoint of practical use. For example, mineral oils, aromatic hydrocarbon oils and low-viscosity silicone fluids are inflammable and chlorinated synthetic oils and notoriously toxic while fluorocarbon oils have a problem of unduly increasing the weight of the electric equipments filled therewith due to the outstandingly high specific gravity thereof in addition to the impractical expensiveness.

Silicone fluids having a high viscosity of, for example, about 50 centistokes or higher at 25° C. are self-extinguishable and have a relatively high flash point so that they can be more flame retardant than the above named insulation oils of other types. The high-viscosity silicone fluids, however, not always can be fully flame retardant and are not usable as a highly reliable flame retardant insulation oil because different methods for the evaluation of the flame retardancy thereof may give different results. To explain in more detail, namely, flame retardancy of insulation oils are evaluated by several different methods including the flash point method, ignition point method, oxygen index method, glass tape method and the like of which the horizontal glass tape method specified in JIS C 2101 may be the most reliable method although a program sponsored by IEC is now under progress to establish a reliable testing method for the evaluation of the flame retardancy of various electric insulation oils. When high-viscosity silicone fluids are tested by the horizontal glass tape method, in which a tape of woven glass fibers is soaked with the silicone fluid and held horizontally to be ignited, they can be classified to the class of flame retardant insulation oils while they are no longer flame retardant when tested by the vertical glass tape method, in which the silicone fluid-soaked glass tape is held vertically to be ignited.

Flame retardancy of a silicone fluid can be enhanced by admixing the fluid with a flame retardant agent and several compounds are proposed as a flame retardant agent in, for example, Japanese Patent KokaiNo. 57-28157 and Japanese Patent Publications Nos. 49-39173, 51-20720 and 59-226408. None of the flame retardant agents in the prior art, however, is fully effective for rendering a silicone fluid flame-retardant.

SUMMARY OF THE INVENTION

The present invention accordingly has an object to provide a flame retardant silicone fluid without the above described problems and disadvantages in the above described conventional electric insulation oils.

The flame retardant silicone fluid composition provided by the present invention comprises, in admixture:

(a) 100 parts by weight of an organopolysiloxane represented by the average unit formula $$R_a SiO_{(4-a)/2}, \tag{I}$$

in which R is a substituted or unsubstituted monovalent hydrocarbon group, from 0.1 to 30% by moles of the groups denoted by R in a molecule being vinyl groups, and a is a positive number in the range from 1.8 to 2.3; and (b) a platinum compound soluble in an organic solvent in an amount in the range from 0.0001 to 0.1 part by weight calculated as platinum.

The flame retardancy of the above described silicone fluid composition can be further enhanced when the composition is admixed with (c) from 10 to 50 parts by weight of a fluorinated hydrocarbon oil.

DETAILED DESCRIPTION OF THE PREFERRED EMBODIMENTS

As is described in the above given summary, the essential ingredients of the inventive flame retardant silicone fluid composition are the specified organopolysiloxane as the base ingredient and a solvent-soluble platinum compound in admixture in a specified amount. The organopolysiloxane as the base material is represented by the above given average unit formula (I), in which the symbol R denotes a substituted or unsubstituted monovalent hydrocarbon group exemplified by alkyl groups, e.g., methyl, ethyl, propyl and butyl grops, cycloalkyl groups, e.g., cyclohexyl group, alkenyl groups, e.g., vinyl and allyl groups, and aryl groups, e.g., phenyl and tolyl groups, as well as those substituted groups obtained by replacing a part or all of the hydrogen atoms in the above named hydrocarbon groups with substituent atoms and/or groups such as halogen atoms, cyano groups and the like, e.g., chloromethyl and 3,3,3-trifluoropropyl groups, and the subscript a is a positive number in the range from 1.8 to 2.3. Although the organopolysiloxane molecules may contain two kinds or more of the hydrocarbon groups denoted by R, from 0.1% to 30% by moles of the groups denoted by R in a molecule should be vinyl groups, the remainder being preferably methyl groups. It is a quite unexpected discovery that no flame retardancy can be imparted to the organopolysiloxane fluid when the proportion of vinyl groups in the monovalent hydrocarbon groups bonded to the silicon atoms is smaller than 0.1% by moles. When the content of vinyl groups in the organopolysiloxane is too large, on the other hand, the heat resistance of the silicone fluid composition may be somewhat decreased with possible increase in the viscosity of the composition during use at an elevated temperature. The viscosity of the organopolysiloxane or the average degree of polymerization thereof is not particularly limitative depending on the intended application of the flame-retardant silicone fluid composition but the viscosity should be in the range from 5 to 1000 centistokes at 25° C. when the composition is used as an insulation oil in electric equipments.

The component (b) in the inventive fluid composition is a platinum compound soluble in an organic solvent exemplified by those used as a catalyst in the hydrosilation reaction including chloroplatinic acid as such, modified with an alcohol or forming a complex with a vinylsiloxane and platinum-triphenyl phosphine complex of the formula Pt.P($C_6H_5$)$_3$ disclosed in U.S. Pat. nos. 3,159,601, 3,159,662 and 3,775,452 and elsewhere. These platinum compounds should be admixed with and dissolved in the organopolysiloxane as the component (a). The amount of the platinum compound added to the organopolysiloxane should be in the range from 0.0001 to 0.1 part by weight or, preferably, from 0.001 to 0.01 part by weight calculated as platinum per 100 parts by weight of the organopolysiloxane. When the amount of the platinum compound is too small, the desired effect for flame retardancy can hardly be obtainedas a matter of course. On the other hand, no further additional improvement in the flame retardancy can be obtained by increasing the amount of the platinum compound over the above mentioned upper limit rather than with economical disadvantage due to the expensiveness of the platinum compound.

Further, it has also been discovered unexpectedly that the flame retardancy of the above described flame-retardant silicone fluid composition can be further increased by admixing the composition with a fluorinated hydrocarbon oil such as an oligomer of chlorotrifluoroethylene. The oligomer should hae a viscosity preferably in the range from 5 to 50 centistokes at 25° C. corresponding to a degree of polymerization of 3 to 5 since a fluorinated hydrocarbon oil having a too high viscosity is poorly miscible with the organopolysiloxane. The amount of the fluorinated hydrocarbon oil in the inventive fluid composition should be in the range from 10 to 50 parts by weight per 100 parts by weight of the organopolysiloxane. When the amount is smaller than the above mentioned lower limit, no substantial improvement in the flame retardancy can be obtained thereby. On the other hand, no further additional improvement can be expected by increasing the amount of the fluorinated hydrocarbon oil in excess of the above mentioned upper limit.

In the following, the flame retardant silicone fluid compositions of the present invention is described in more detail by way of examples, in which the term "parts" always refers to "parts by weight" and each of the values of viscosity was obtained by the measurement at 25° C. The flame retardancy of the silicone fluids prepared in the examples was evaluated by one ore more of the following combustion testing methods.

(1) Horizontal method

Measurement was performed according to the procedure specified in JIS C 2101.

(2) Vertical method

The same glass fiber tape as used in the above mentioned horizontal method was soaked with a specified amount of the fluid composition and vertically hung to be ignited at the lower end by contacting a flame and to examine the combustibility.

(3) Oxygen index method

The oxygen index of the fluid composition was measured in an apparatus therefor specified in JIS K 7201 using a metal-made combustion cell and a glass fiber wick having a diameter of 2.5 mm and a length of 25 mm protruded in a length of 3 mm.

(4) Asbestos method

An asbestos mat of 20 mm by 40 mm wide having a thickness of 1 to 2 mm and soaked with the fluid composition was put on two horizontally supported wire bars in parallel and ignited by using a propane gas burner to examine the combustibility.

EXAMPLES 1 TO 9 AND COMPARATIVE EXAMPLES 1 TO 8

Six methyl vinyl polysiloxane fluids having different viscosities and different contents of vinyl groups as indicated in Table 1 below were each admixed with chloroplatinic acid in an amount indicated in Table 1 and the flame retardancy thereof was evaluated by the horizontal method and vertical method to find that each of the fluid compositions was satisfactorily self-extinguishable (Examples 1 to 9).

For comparison, the same methyl vinyl polysiloxane fluids as used in the above described Examples 1 to 3 and 7 to 9 were each subjected to the combustion tests without admixture of chloroplatinic acid (Comparative Examples 1 to 6). For further comparison, a dimethyl polysiloxane fluids having a viscosity of 1000 and 350 centistokes were each admixed with 100 ppm as platinum of chloroplatinic acid and the flame retardancy thereof was evaluated in the same manner as in Examples 1 to 9 (Comparative Examples 7 and 8). The results in thes comparative tests were that each of the fluids was self-extinguishable by the horizontal method but combustible by the vertical method.

TABLE 1

| Example No. | Organopolysiloxane | | Chloroplatinic acid added, ppm as Pt |
|---|---|---|---|
| | Viscosity, centistokes | Content of vinyl groups, % by moles | |
| 1 | 775 | 1 | 50 |
| 2 | 679 | 5 | 100 |
| 3 | 661 | 10 | 10 |
| 4 | 500 | 3 | 150 |
| 5 | 362 | 5 | 150 |
| 6 | 140 | 5 | 150 |
| 7 | 350 | 1 | 50 |
| 8 | 200 | 5 | 50 |
| 9 | 150 | 10 | 100 |

EXAMPLES 10 TO 13 AND COMPARATIVE EXAMPLES 9 TO 11

Methyl vinyl polysiloxane fluids having a viscosity of 20 to 50 centistokes and a content of vinyl groups of 10% or 20% by moles were admixed with chloroplatinic acid in an amount of 50 or 100 ppm as platinum as indicated in Table 2 and each subjected to the evaluation of the flame retardancy by the horizontal method, vertical method and oxygen index method (Examples 10 to 13). The results were that the fluid compositions in Examples 10 to 12 were each self-extinguishable by the horizontal method but combustible by the vertical method while the fluid composition in Example 13 was combustible in both of the horizontal and vertical methods. The oxygen indices are shown in Table 2.

For comparison, the same organopolysiloxane fluids as used in Examples 10 and 12 were subjected to the same tests as above without addition of chloroplatinic acid (Comparative Examples 9 and 10, respectively). For further comparison, a dimethyl polysiloxane fluid having a viscosity of 50 centistokes was admixed with chloroplatinic acid in an amount of 100 ppm as platinum and subjected to the same tests (Comparative Example 11). The results were that these comparative fluids were combustible in both of the horizontal method and vertical method. The oxygen indices of these comparative fluids are shown in Table 2.

TABLE 2

| | Organopolysiloxane | | Chloro- | |
|---|---|---|---|---|
| | Viscosity, centistokes | Content of vinyl groups, % by moles | platinic acid added, ppm as Pt | Oxygen index |
| Example | | | | |
| 10 | 50 | 20 | 50 | 43–45 |
| 11 | 30 | 10 | 50 | 42–44 |
| 12 | 25 | 20 | 50 | 42–44 |
| 13 | 20 | 20 | 100 | 40–42 |
| Comparative Example | | | | |
| 9 | 50 | 20 | 0 | 38–40 |
| 10 | 25 | 20 | 0 | 36–38 |
| 11 | 50 | 0 | 100 | 36–38 |

EXAMPLES 14 TO 17

Methyl vinyl polysiloxane fluids, in each of which the content of vinyl groups relative to the hydrocarbon groups was 20% by moles, having a viscosity of 16 to 26 centistokes were each admixed with chloroplatinic acid in an amount indicated in Table 3 below together with an oligomeric chlorotrifluoro ethylene polymer having a viscosity of 20 centistokes, referred to as the fluorine polymer hereinbelow, in an amount also indicated in Table 3 per 100 parts of the methyl vinyl polysiloxane fluid. The thus prepared silicone fluid compositions were each subjected to the evaluation of the flame retardancy by the horizontal method and asbestos method to find that the fluids in Examples 14 and 15 were self-extinguishable in both of the testing methods while the fluids in Examples 16 and 17 were self-extinguishable by the horizontal method but combustible by the asbestos method.

TABLE 3

| Example No. | Viscosity of organopolysiloxane, centistokes | Chloroplatinic acid added, ppm as Pt | Fluorine polymer added, parts |
|---|---|---|---|
| 14 | 16 | 50 | 50 |
| 15 | 20 | 70 | 30 |
| 16 | 24 | 90 | 10 |
| 17 | 26 | 100 | 0 |

What is claimed is:

1. A flame retardant silicone fluid composition which comprises, in admixture:
   (a) 100 parts by weight of an organopolysiloxane represented by the average unit formula $R_aSiO_{(4-a)/2}$, in which R is a substituted or unsubstituted monovalent hydrocarbon group, from 0.1 to 30% by moles of the groups denoted by R in a molecule being vinyl groups, and a is a positive number in the range from 1.8 to 2.3; and
   (b) a platinum compound soluble in an organic solvent in an amount in the range from 0.0001 to 0.1 part by weight calculated as platinum.

2. The flame retardant silicone fluid composition as claimed in claim 1 wherein the groups denoted by R other than vinyl groups are methyl groups.

3. The flame retardant silicone fluid composition as claimed in claim 1 wherein the organopolysiloxane as the component (a) has a viscosity in the range from 5 to 1000 centistokes at 25° C.

4. The flame retardant silicone fluid composition as claimed in claim 1 wherein the platinum compound soluble in an organic solvent is chloroplatinic acid.

5. The flame retardant silicone fluid composition as claimed in claim 1 which further comprises:
   (c) from 10 to 50 parts by weight of a fluorinated hydrocarbon oil.

6. The flame retardant silicone fluid composition as claimed in claim 5 wherein the fluorinated hydrocarbon oil is an oligomeric polymer of chlorotrifluoroethylene.

7. The flame retardant silicone fluid composition as claimed in claim 6 wherein the oligomeric polymer of chlorotrifluoroethylene has a viscosity in the range from 5 to 50 centistokes at 25° C.

* * * * *